(12) United States Patent
Wei et al.

(10) Patent No.: US 10,987,582 B2
(45) Date of Patent: *Apr. 27, 2021

(54) SYSTEM AND METHOD FOR PROVIDING AWARDS TO USERS OF AN ONLINE GAME

(71) Applicant: Kabam, Inc., San Francisco, CA (US)

(72) Inventors: Albert Wei, San Francisco, CA (US); Kevin Lee, Fremont, CA (US); Jay Jodway, San Francisco, CA (US); David McNeill, San Francisco, CA (US); Devin Nambiar, Hayward, CA (US)

(73) Assignee: Kabam, Inc., San Francisco, CA (US)

(*) Notice: Subject to any disclaimer, the term of this patent is extended or adjusted under 35 U.S.C. 154(b) by 128 days.

This patent is subject to a terminal disclaimer.

(21) Appl. No.: 16/380,646

(22) Filed: Apr. 10, 2019

(65) Prior Publication Data
US 2019/0232163 A1    Aug. 1, 2019

Related U.S. Application Data

(63) Continuation of application No. 15/925,580, filed on Mar. 19, 2018, now Pat. No. 10,258,883, which is a continuation of application No. 14/293,969, filed on Jun. 2, 2014, now Pat. No. 9,962,605.

(51) Int. Cl.
*A63F 13/69* (2014.01)
*A63F 13/50* (2014.01)
*A63F 13/798* (2014.01)
*A63F 13/88* (2014.01)

(52) U.S. Cl.
CPC .............. *A63F 13/50* (2014.09); *A63F 13/69* (2014.09); *A63F 13/798* (2014.09); *A63F 13/88* (2014.09)

(58) Field of Classification Search
CPC ........ A63F 13/50; A63F 13/69; A63F 13/798; A63F 13/88
See application file for complete search history.

(56) References Cited

U.S. PATENT DOCUMENTS

| | | | |
|---|---|---|---|
| 7,568,973 B2 | 8/2009 | Iddings | |
| 8,152,630 B2 | 4/2012 | Cohen | |
| 8,162,316 B2 | 4/2012 | Andersen | |
| 8,292,725 B2 | 10/2012 | Wikander | |
| 8,512,147 B2 | 8/2013 | Aoki | |
| 8,585,489 B2 | 11/2013 | Cannon | |
| 8,662,985 B2 | 3/2014 | Johnson | |
| 8,715,085 B2 | 5/2014 | Crowder | |
| 2006/0025201 A1 | 2/2006 | Asdale | |
| 2006/0135238 A1 | 6/2006 | Lancaster | |
| 2009/0069075 A1 | 3/2009 | Silvestro | |
| 2010/0124978 A1 | 5/2010 | Depalma | |
| 2010/0160017 A1 | 6/2010 | Canard | |
| 2011/0143834 A1 | 6/2011 | Guinn | |
| 2011/0145050 A1 | 6/2011 | Gross | |
| 2012/0077569 A1 | 3/2012 | Watkins | |

(Continued)

*Primary Examiner* — Tramar Harper
*Assistant Examiner* — Jeffrey K Wong
(74) *Attorney, Agent, or Firm* — Esplin & Associates, PC

(57) ABSTRACT

An online game is provided to users via client computing devices. Gameplay metrics are determined for users of the online game based on actions taken by the users in the online game. Secondary games are provided, where the potential awards provided by the secondary games are determined based on the gameplay metrics of the users.

16 Claims, 5 Drawing Sheets

(56) References Cited

U.S. PATENT DOCUMENTS

| | | |
|---|---|---|
| 2014/0243072 A1 | 8/2014 | Santini |
| 2014/0243074 A1 | 8/2014 | Frank |
| 2015/0031440 A1* | 1/2015 | Desanti .................. A63F 13/69 463/25 |

* cited by examiner

SYSTEM AND METHOD FOR PROVIDING AWARDS TO USERS OF AN ONLINE GAME

FIELD OF THE DISCLOSURE

This disclosure relates to providing awards to users of an online game and in particular providing awards to users through secondary games associated with an online game.

BACKGROUND

The popularity of online games has grown over the years. These games employ various mechanisms and use various methods to retain interest in the online game. One such method is to provide other games to users of the online game. These other games may be associated with the online game.

SUMMARY

One aspect of the disclosure relates to a system for providing awards to users of a virtual space. In some implementations, the system may include one or more physical computer processors configured by machine readable instructions to perform one or more functions. While the following description refers to components, it would be understood by one of ordinary skill in the art that this application is intended to cover any manner of instructions configured to facilitate the herein disclosed functions.

The one or more processors may be configured by machine readable instructions to perform and/or facilitate the performance of one or more of the following components: a space component, a user component, a gameplay metric component, a secondary game component, a notification component, a distribution component, and/or one or more other components.

The space component may be configured to implement an instance of an online game to facilitate player participation in the online game. A first player may participate in the online game through views of the online game presented through a game interface on a client computing device. The client computing device may be any client computing device, for example a personal computer, a smartphone, a tablet, a mobile computing device and/or any client computing device.

The gameplay metric component may be configured to determine a gameplay metric for the players of the online game. The gameplay metric may be based on actions taken by players in the online game. The first gameplay metric for the first player may be based on the actions taken by the first player in the online game.

The gameplay metric may be based on a progress of the player in the online game. The gameplay metric may be based on an amount of resources collected by the player in the online game. Resources may include virtual items obtained in the online game during gameplay, such as troops, buildings, minerals, food items, precious items and/or other virtual items in the online game. The gameplay metric may be based on an amount of virtual currency obtained, spent, and/or held by the player of the online game.

The gameplay metric may be based on achievements by the players in quests, missions, and/or other aspects of the online game. The gameplay metric may be based on a player's social rank within the online game and/or across one or more online gaming platforms associated with the online game.

The secondary game component may be configured to selectively provide access for the players to a secondary game. Access to the secondary game may be provided in response to an achievement realized by the players in the online game. Access to the secondary game may be based on an amount of virtual items held by the player and/or the player's character in the online game. For example, access to the secondary game may be provided to players who have obtained, spent, and/or hold more than a threshold amount of virtual currency, in-game resources, troops, buildings, and/or other virtual items in the online game. Access to the secondary game may be provided to players based on the gameplay metric of the players. Access to the secondary game may be provided based on one or more parameters associated with the players. The one or more parameters may include demographic parameters, such as geographical location, age, gender, income levels, spend history, and/or other parameters associated with the player of the online game. The one or more parameters may be based on in-game play of the player in the online game, and/or other parameters associated with the players.

The secondary game component may be configured to effectuate presentation of an interface to players to facilitate plays of the secondary game. The players may be presented with the secondary game through the game interface while participating in the online game. For example, in response to an event triggering the secondary game, the secondary game may be presented to the player in the same interface as the online game. The secondary game may be presented to the players as an overlay to the online game, such that the secondary game is presented to the players in the interface above the presentation of the online game. The secondary game may be presented to the players, replacing the online game presented to the players through the interface, such that the players are no longer presented with views of the online game when presented with the secondary game.

In some implementations the secondary game may be presented in a secondary game interface. The secondary game interface may be presented through client computing devices associated with the players. The client computing devices that the secondary game interface is presented to the players may be different from the client computing devices that the online game interface is presented to the players. The secondary game interface may be presented on the same client computing device as the online game interface.

The secondary game may include a set of potential awards. The potential awards of the set of potential awards may include virtual items usable in the online game by players. The virtual items may provide an advantage to the players in the online game. The potential awards of the sets of potential awards may have an associated user cost. The associated user cost may be based on a perceived value of the potential award to the user. For example, the perceived value to the user may be based on an advantage that the potential award may provide to the player of the online game. The user cost may be different for individual players of the online game. An advantage provided to players of the online game may have a different perceived value to the user based on a user's status within the online game and/or based on one or more parameters of the user of the online game.

Individual plays of the secondary game may be provided to players and/or users of the online game in exchange for providing the associated user cost of the set of potential awards for the individual plays of the secondary game. The associated user cost may be an amount of virtual currency, one or more virtual items, and/or other items that the player may provide in exchange for participating in a play of the secondary game.

Plays of the secondary game for users having a higher gameplay metric value may have a higher associated user cost compared to plays of the secondary game for users having a lower gameplay metric value. Users having a higher gameplay metric value may be users that have a propensity to play the online game and/or the secondary game and may be more willing to spend more on plays of the secondary game. In some implementations, the awards in the sets of potential awards for players having a higher gameplay metric may have a higher perceived value and therefore may command a higher associated user cost.

The secondary game component may be configured to determine, for individual plays of the secondary game, subsets of potential awards based on the gameplay metrics for the players playing the secondary game. For example, for a first play of the secondary game by the first user, a first subset of potential awards may be determined based on the gameplay metric for the first player. The subsets of potential awards may be associated with different gameplay metrics for the players. The different gameplay metrics may be associated with different aspects of the online game and/or different aspects of the gameplay of the player and/or user. The sets of potential awards may be based on discrete levels of the gameplay metrics. The sets of potential awards may be based on thresholds of values of the gameplay metrics. In some implementations, for higher levels of gameplay metrics, the potential awards of the sets of potential awards associated with the gameplay metrics may have a higher perceived value in the online game.

The subsets of potential awards may comprise virtual items, wherein the virtual items have a perceived value in the online game. The virtual items in the subsets of potential awards that correspond to higher activity metric values may have a higher perceived value in the online game than the virtual items in subsets of potential awards corresponding to lower activity metric values.

The secondary game component may be configured to determine, for individual plays of the secondary game, an outcome of the secondary game. The outcome of the secondary game may include one or more awards from the subset of potential awards as the actual award that is provided to the player. For example, for a first play of the secondary game by the first user, a first actual award may be determined from the first subset of potential awards to provide to the user. The outcome of the secondary game may include not receiving an award from the set of potential awards. The outcome of the secondary game may include an additional play of the secondary game.

The distribution component may be configured to facilitate distribution of the award(s) to the players that have been obtained by the players during the plays of the secondary game. For example, the first actual award may be distributed to the first user.

The notification component may be configured to provide notifications to users of the online game of an indication of the subsets of potential awards that correspond to the game play metrics of the users that are available in the secondary game. For example, for a first user a notification may be provided to the first user of the first subset of potential awards that correspond to the gameplay metric of the first user. Such notifications may be provided in order to incentivize players and/or users of the online game to play the secondary game.

The notification component may be configured to provide notifications to users of the online game of an indication of the subsets of potential awards that correspond to a higher game play metric than the current gameplay metric of the users. For example, for a first user a notification may be provided to the first user of a second subset of potential awards that correspond to a higher gameplay metric than the gameplay metric of the first user. Such notifications may be provided to incentivize the players to advance in the online game and/or take further actions in the online game. The online game may have one or more monetization mechanics. By incentivizing players to advance in the online game, take additional actions in the online game, and/or increase gameplay metrics, the online game provider may increase monetization of the users.

In some implementations, the secondary game component may be configured to obtain sets of probabilities for the awards in the subsets of potential awards. The secondary game component may be configured to stochastically or quasi-stochastically select an award from the subsets of potential awards as the actual award for distribution to the users.

The secondary game component may be configured to provide players with additional plays of the secondary game. The secondary game component may be configured to determine, for individual plays of the secondary game, an outcome of the secondary game, wherein the outcome includes an award from the subset of potential awards as the actual award. For example, for a second play of the secondary game by the first user, a second actual award may be determined from the first subset of potential awards.

Another aspect of the disclosure relates to a method for providing awards to users of a virtual space. The method may be performed on a computer having one or more physical processors. The method may comprise implementing an instance of an online game to facilitate player participation in the online game. For example, a first player may participate in the online game through views of the online game presented through a game interface on a client computing device. The client computing device may be associated with the player. The method may comprise determining a gameplay metric for the players of the online game. The gameplay metric may be based on actions taken by players in the online game. For example, a first gameplay metric for the first player may be based on the actions taken by the first player in the online game.

The method may comprise selectively providing access for the players to a secondary game. The players may be presented with the secondary game through the game interface while participating in the online game. The secondary game may include a set of potential awards. The method may comprise determining, for individual plays of the secondary game, subsets of potential awards based on the gameplay metrics for the players playing the secondary game. For example, for a first play of the secondary game by the first user, a first subset of potential awards may be determined based on the gameplay metric for the first player.

The method may comprise determining, for individual plays of the secondary game, an outcome of the secondary game. The outcome of the secondary game may include one or more of nothing, an award from the subset of potential awards as the actual award, and/or an additional play of the secondary game. For example, for a first play of the secondary game by the first user, a first actual award may be determined from the first subset of potential awards.

The method may further comprise facilitating distribution of the award(s) obtained during the plays of the secondary game to the users, such that the first actual award may be distributed to the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
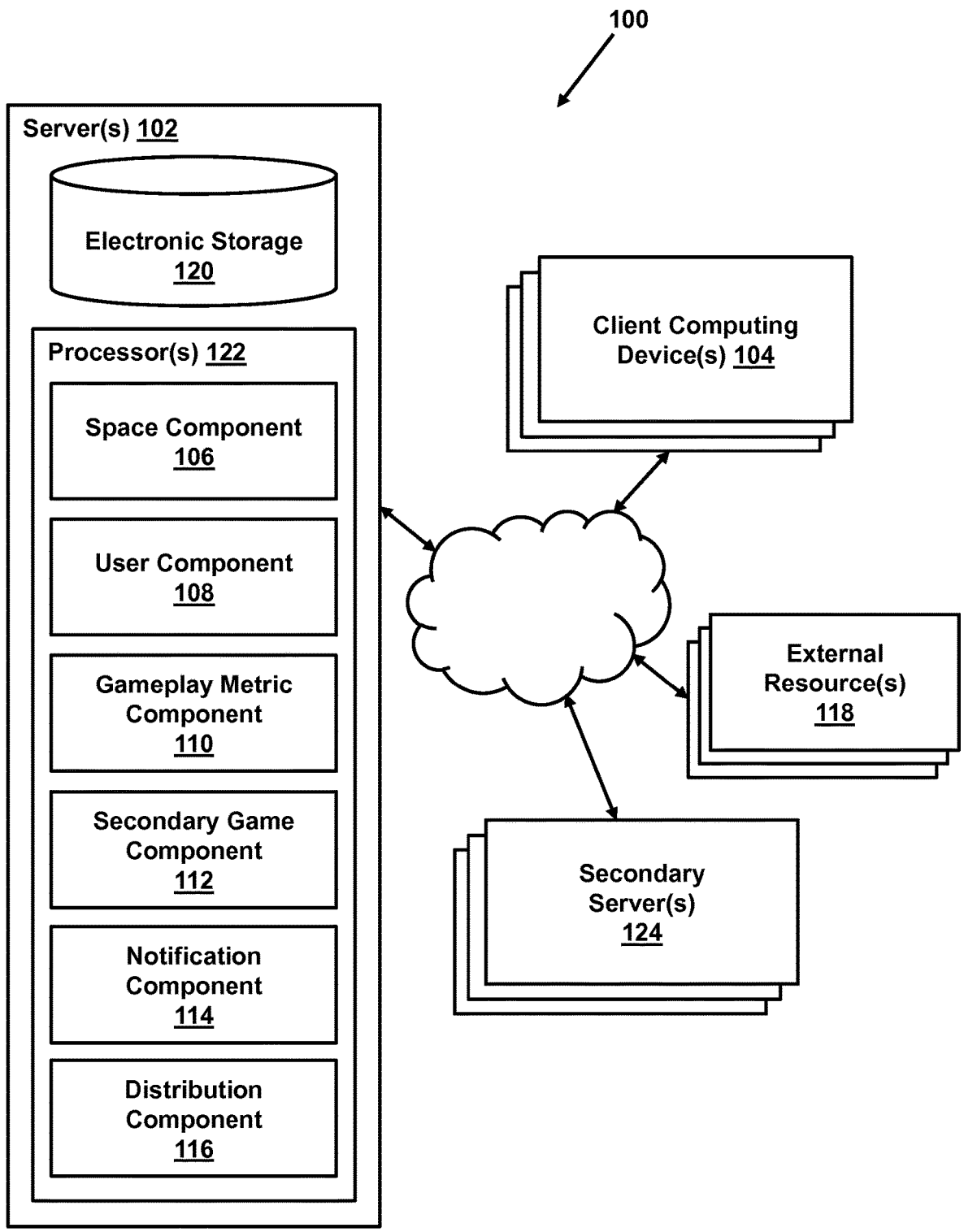
FIG. 1 illustrates a system for providing awards to users of a virtual space, in accordance with one or more implementations.

FIG. 1 illustrates a system 100 configured for providing awards to users of a virtual space. In some implementations, system 100 may include a server 102. The server 102 may be configured to communicate with one or more client computing devices 104 according to a client/server architecture. The users may access system 100 and/or the virtual space via client computing devices 104. In some implementations, system 100 may include one or more of one or more servers 102, one or more secondary servers 124, and/or other components. The server(s) 102 and/or 124 may be configured to communicate with one or more client computing devices 104 according to a client/server architecture to provide the virtual space to users via the client computing devices 104. The secondary server(s) 124 may be configured to interface with server(s) 102 to supplement the functionality provided to the users with respect to the virtual space. For example, secondary server(s) 124 may interface with server(s) 102 via one or more application programming interfaces.

The server 102 may be configured to execute one or more computer program components. The computer program components may include one or more of a space component 106, a user component 108, a gameplay metric component 110, a secondary game component 112, a notification component 114, an distribution component 116, and/or one or more other components.

The server 102, client computing devices 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing devices 104, and/or external resources 118 may be operatively linked via some other communication media.

A given client computing device 104 may include one or more processors configured to execute computer program components. The computer program components may be configured to enable an expert or user associated with the given client computing device 104 to interface with system 100 and/or external resources 118, and/or provide other functionality attributed herein to client computing devices 104. By way of non-limiting example, the given client computing device 104 may include one or more of a desktop computer, a laptop computer, a handheld computer, a tablet computing platform, a NetBook, a Smartphone, a gaming console, and/or other computing platforms.

The external resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

The server 102 may include electronic storage 120, one or more processors 122, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 120 may comprise electronic storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor 122, information received from server 102, information received from client computing devices 104, and/or other information that enables server xx to function as described herein.

Processor(s) 122 is configured to provide information processing capabilities in server(s) 102. As such, processor 122 may include one or more of a digital processor, an analog processor, a digital circuit designed to process information, an analog circuit designed to process information, a state machine, and/or other mechanisms for electronically processing information. Although processor 122 is shown in FIG. 1 as a single entity, this is for illustrative purposes only. In some implementations, processor 122 may include a plurality of processing units. These processing units may be physically located within the same device, or processor 122 may represent processing functionality of a plurality of devices operating in coordination. The processor 122 may be configured to execute components 106, 108, 110, 112, 114, 116, and/or one or more other components. Processor 122 may be configured to execute components 106, 108, 110, 112, 114, 116, and/or one or more other components by software; hardware; firmware; some combination of software, hardware, and/or firmware; and/or other mechanisms for configuring processing capabilities on processor 122.

It should be appreciated that although components 106, 108, 110, 112, 114, and 116 are illustrated in FIG. 1 as being co-located within a single processing unit, in implementations in which processor 122 includes multiple processing units, one or more of components 106, 108, 110, 112, 114, 116 and/or one or more other components may be located remotely from the other components. The description of the functionality provided by the different components 106, 108, 110, 112, 114, 116 and/or one or more other components described below is for illustrative purposes, and is not intended to be limiting, as any of components 106, 108, 110, 112, 114, 116 and/or one or more other components may provide more or less functionality than is described. For example, one or more of components 106, 108, 110, 112, 114, 116 and/or one or more other components may be eliminated, and some or all of its functionality may be provided by other ones of components 106, 108, 110, 112, 114, 116 and/or one or more other components. As another example, processor 122 may be configured to execute one or more additional components that may perform some or all of the functionality attributed below to one of components 106, 108, 110, 112, 114, 116 and/or one or more other components.

The user component 108 may be configured to access and/or manage one or more user profiles and/or user information associated with users of the system 100. The one or more user profiles and/or user information may include information stored by server(s) 102, one or more of the client computing device(s) 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing device identification associated with a user, a phone number associated with a user, and/or other information related to users.

The space component 106 may be configured to implement the instance of the virtual space executed by the computer components to determine state of the virtual space. The state may then be communicated (e.g., via streaming visual data, object/position data, and/or other state information) from server 102 to client computing devices 104 for presentation to users. The state determined and transmitted to a given client computing device 104 may correspond to a view for a user character being controlled by a user via the given client computing device 104. The state determined and transmitted to a given client computing device 104 may correspond to a location in the virtual space. The view described by the state for the given client computing device may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing devices 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which a state of the virtual space is determined by space component 106 is not intended to be limiting. The space component 106 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place beyond the relatively generic graphics. For example, a view may include a generic battle graphic with a textual description of the opponents to be confronted. Other expressions of individual places within the virtual space are contemplated.

Within the instance(s) of the virtual space executed by space component 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space and/or other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

The users may participate in the instance of the virtual space by controlling one or more of the available user-controlled elements in the virtual space. Control may be exercised through control inputs and/or commands input by the users through client computing devices 104. The users may interact with each other through communications exchanged within the virtual space. Such communications may include one or more of textual chat, instant messages, private messages, voice communications, and/or other communications. Communications may be received and entered by the users via their respective client computing devices 104. Communications may be routed to and from the appropriate users through server 102 (e.g., through space component 106).

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

The space component 106 may be configured to implement an instance of an online game to facilitate player participation in the online game. A first player may participate in the online game through views of the online game presented through a game interface on a client computing device 104. The client computing device 104 may be any client computing device, for example, a personal computer, a smartphone, a tablet, a mobile computing device, and/or any client computing device.

The gameplay metric component 110 may be configured to determine a gameplay metric for the players of the online game. The gameplay metric may be based on actions taken by players in the online game. The first gameplay metric for the first player may be based on the actions taken by the first player in the online game.

The gameplay metric may be based on a progress of the player in the online game. The gameplay metric may be based on an amount of resources collected by the player in the online game. Resources may include virtual items obtained in the online game during gameplay, such as troops, buildings, minerals, food items, precious items, and/or other virtual items in the online game. The gameplay metric may be based on an amount of virtual currency obtained, spent, and/or held by the player of the online game.

The gameplay metric may be based on achievements by the players in quests, missions, and/or other aspects of the online game. The gameplay metric may be based on a player's social rank within the online game and/or across one or more online gaming platforms associated with the online game.

The secondary game component 112 may be configured to selectively provide access for the players to a secondary game. Access to the secondary game may be provided in response to an achievement realized by the players in the online game. Access to the secondary game may be based on an amount of virtual items held by the player and/or the player's character in the online game. For example, access to the secondary game may be provided to players who have obtained, spent, and/or hold more than a threshold amount of virtual currency, in-game resources, troops, buildings, and/or other virtual items in the online game. Access to the secondary game may be provided to players based on the gameplay metric of the players. Access to the secondary game may be provided based on one or more parameters associated with the players. The one or more parameters may include demographic parameters, such as geographical location, age, gender, income levels, spend history, and/or other parameters associated with the player of the online game. The one or more parameters may be based on in-game play of the player in the online game, and/or other parameters associated with the players.

The secondary game component 112 may be configured to effectuate presentation of an interface to players to facilitate plays of the secondary game. The players may be presented with the secondary game through the game interface while participating in the online game. For example, in response to an event triggering the secondary game, the secondary game may be presented to the player in the same interface as the online game. The secondary game may be presented to the players as an overlay to the online game, such that the secondary game is presented to the players in the interface above the presentation of the online game. The secondary game may be presented to the players, replacing the online game presented to the players, such that the players are no longer presented with views of the online game when presented with the secondary game.

In some implementations, the secondary game may be presented in a secondary game interface. The secondary game interface may be presented through client computing devices associated with the players. The client computing devices through which the secondary game interface is presented to the players may be different from the client computing devices through which the online game interface is presented to the players. The secondary game interface may be presented on the same client computing device as the online game interface.

The secondary game may include a set of potential awards. The potential awards of the set of potential awards may include virtual items usable in the online game by players. The virtual items may provide an advantage to the players in the online game. The potential awards of the sets of potential awards may have an associated user cost. The associated user cost may be based on a perceived value of the potential award to the user. For example, the perceived value to the user may be based on an advantage that the potential award may provide to the player of the online game. The user cost may be different for individual players of the online game. An advantage provided to players of the online game may have a different perceived value to the user based on a user's status within the online game and/or based on one or more parameters of the user of the online game.

Individual plays of the secondary game may be provided to players and/or users of the online game in exchange for providing the associated user cost of the set of potential awards for the individual plays of the secondary game. The associated user cost may be an amount of virtual currency, one or more virtual items, and/or other items that the player may provide in exchange for participating in a play of the secondary game.

Plays of the secondary game for users having a higher gameplay metric value may have a higher associated user cost compared to plays of the secondary game for users having a lower gameplay metric value. Users having a higher gameplay metric value may be users that have a propensity to play the online game and/or the secondary game and may be more willing to spend more on plays of the secondary game. In some implementations, the awards in the sets of potential awards for players having a higher gameplay metric may have a higher perceived value and therefore may command a higher associated user cost.

The secondary game component 112 may be configured to determine, for individual plays of the secondary game, subsets of potential awards based on the gameplay metrics for the players playing the secondary game. For example, for a first play of the secondary game by the first user, a first subset of potential awards may be determined based on the gameplay metric for the first player. The subsets of potential awards may be associated with different gameplay metrics for the players. The different gameplay metrics may be associated with different aspects of the online game and/or different aspects of the gameplay of the player and/or user. The sets of potential awards may be based on discrete levels of the gameplay metrics. The sets of potential awards may be based on thresholds of values of the gameplay metrics. In some implementations, for higher levels of gameplay metrics, the potential awards of the sets of potential awards associated with the gameplay metrics may have a higher perceived value in the online game.

The subsets of potential awards may comprise virtual items, wherein the virtual items have a perceived value in the online game. The virtual items in the subsets of potential awards that correspond to higher activity metric values may have a higher perceived value in the online game than the virtual items in subsets of potential awards corresponding to lower activity metric values.

The secondary game component 112 may be configured to determine, for individual plays of the secondary game, an outcome of the secondary game. The outcome of the secondary game may include one or more awards from the subset of potential awards as the actual award that is provided to the player. For example, for a first play of the secondary game by the first user, a first actual award may be determined from the first subset of potential awards to provide to the user. The outcome of the secondary game may include not receiving an award from the set of potential awards. The outcome of the secondary game may include an additional play of the secondary game.

In some implementations, the secondary game component 112 may be configured to obtain sets of probabilities for the awards in the subsets of potential awards. The secondary game component 112 may be configured to stochastically or quasi-stochastically select an award from the subsets of potential awards as the actual award for distribution to the users.

The secondary game component 112 may be configured to provide players with additional plays of the secondary game. The secondary game component 112 may be configured to determine, for individual plays of the secondary game, an outcome of the secondary game, wherein the outcome includes an award from the subset of potential awards as the actual award. For example, for a second play of the secondary game by the first user, a second actual award may be determined from the first subset of potential awards.

The distribution component 116 may be configured to facilitate distribution of the award(s) to the players that have been obtained by the players during the plays of the secondary game. For example, the first actual award may be distributed to the first user.

Figure 2A:
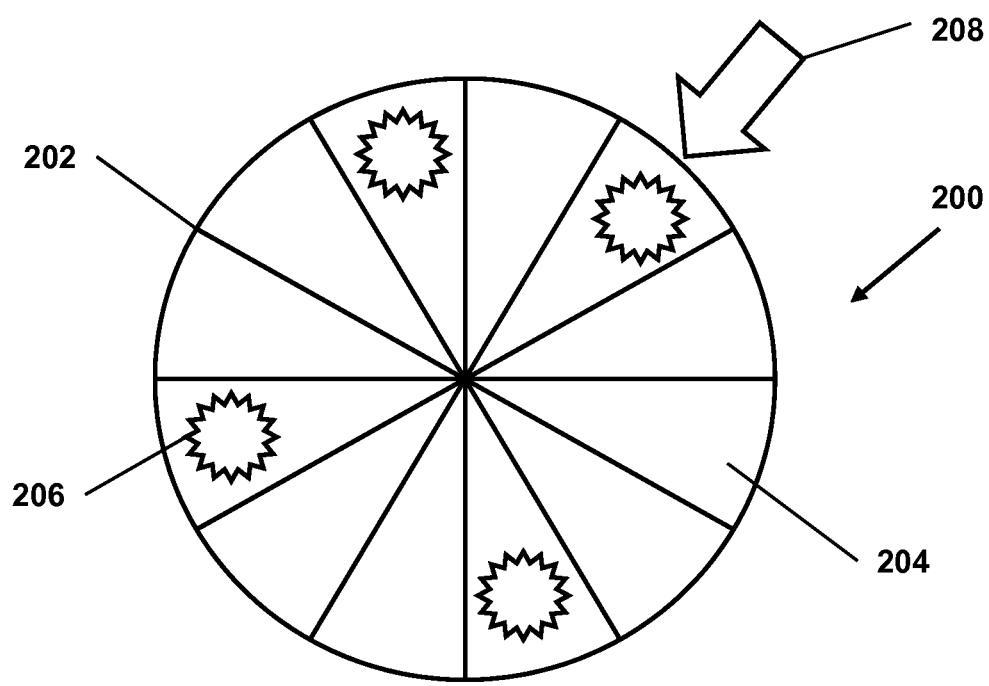
FIG. 2A illustrates an implementation of a secondary game, in accordance with one or more implementations.

FIG. 2A illustrates an implementation of a secondary game, in accordance with one or more implementations. Specifically, FIG. 2A illustrates a wheel-based secondary game 200. The wheel-based secondary game 200 may be provided to users through an online game interface. In some implementations, the wheel-based secondary game 200 may be provided to users through a separate secondary game interface.

In a wheel-based game 200, the player and/or user may be presented with a wheel 202 that is divided into multiple segments 204. Each segment 204 may have an associated outcome 206. Individual outcomes may include one or more awards from the set of potential awards, a second turn, nothing, and/or other outcome 206. The player or user of the wheel-based game 200 may interact with the secondary wheel-based game 200 to spin the wheel 202, wherein the wheel 202 will eventually slow and/or stop with one segment 204 landing adjacent to or on a marker 208. The player may then receive the outcome associated with that segment 204.

Each segment 204 may have an indication of the associated outcome 206 and/or award associated with the outcome. As such, the set of outcomes may be determined prior to the wheel 202 slowing down and stopping, wherein a segment 204 is adjacent to or at the marker 208. The outcomes 206 may be determined prior to an input from the user causing the wheel 202 to spin, immediately after an input from the user causing the wheel 202 to spin, during the spinning of the wheel 202, or immediately prior to the wheel 202 slowing and stopping at or adjacent to marker 208. In some implementations, each segment 204 may provide no indication of the associated outcome 206 and/or award associated with the outcome. As such, the set of outcomes may be determined as described above, or, additionally, the set of outcomes may be determined after the wheel 202 has stopped spinning and is adjacent to marker 208.

Figure 2B:
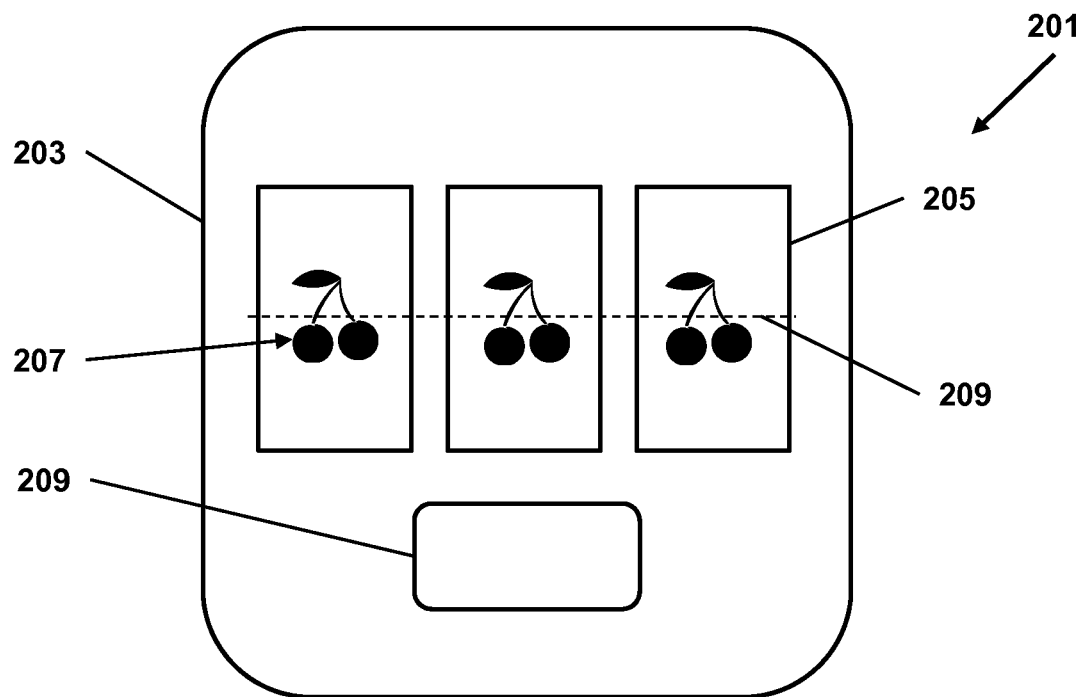
FIG. 2B illustrates an implementation of a secondary game, in accordance with one or more implementations.

FIG. 2B illustrates a slot machine-based secondary game 201. In a slot-machine-based game 201, the user may be presented with a slot machine 203. The slot machine 203 may comprise one or more virtual reels 205, each reel having multiple pictures 207 on them. When the user enters and/or selects a command to start the rotation of the reels 205, by, for example, interacting with a button 209, the reels 205 spin. After a period of time, the reels 205 will slow and cause the pictures 207 on the reels 205 to be presented to the user along a payline 209. If the pictures 207 that line up along the payline 209 match one or more outcomes having an associated award, the user may obtain the award.

The secondary game contemplated by the disclosure herein described is not limited to the illustrations of the secondary games provided, nor is it limited to the types and/or genre of secondary games provided. The secondary game may be a turn-based game, a skill-based game, and/or other type of game. The secondary game may be a game similar in appearance and/or gameplay to the online game. The secondary game may be similar to a casino-type game. The secondary game may be any type of game.

Each play of the secondary game may have an associated user cost of an amount of virtual currency. The user may obtain virtual currency for use in the online game and/or the secondary game. The virtual currency may be exchangeable for virtual items in the online game and for plays of the secondary game. In some implementations, plays of the secondary game may not have an associated user cost.

An indication of the amount of virtual currency held in credit for the user may be provided to the users. Each time the user participates in a play of the secondary game, for example, each time the user spins the wheel 202 and/or activates the slot machine 203, an amount of virtual currency may be subtracted from the indication of the amount of virtual currency, where plays of the secondary game have an associated user cost. In some implementations, the user may pay a sum of virtual currency for a defined number of plays of the secondary game. For example, the user may pay 5 credits of virtual currency for 10 plays of the secondary game. As such, the secondary game may be configured to offer bulk purchases of plays, where, prior to the user participating in the secondary game, the user makes a purchase, using virtual currency, of a defined number of plays.

The associated user cost associated with the secondary game may be defined, or may be variable, dependent upon one or more user variables. The associated user cost of participation in the secondary game may be determined based upon one or more user parameters that provide an indication of the user's propensity to spend virtual currency.

Figure 3:
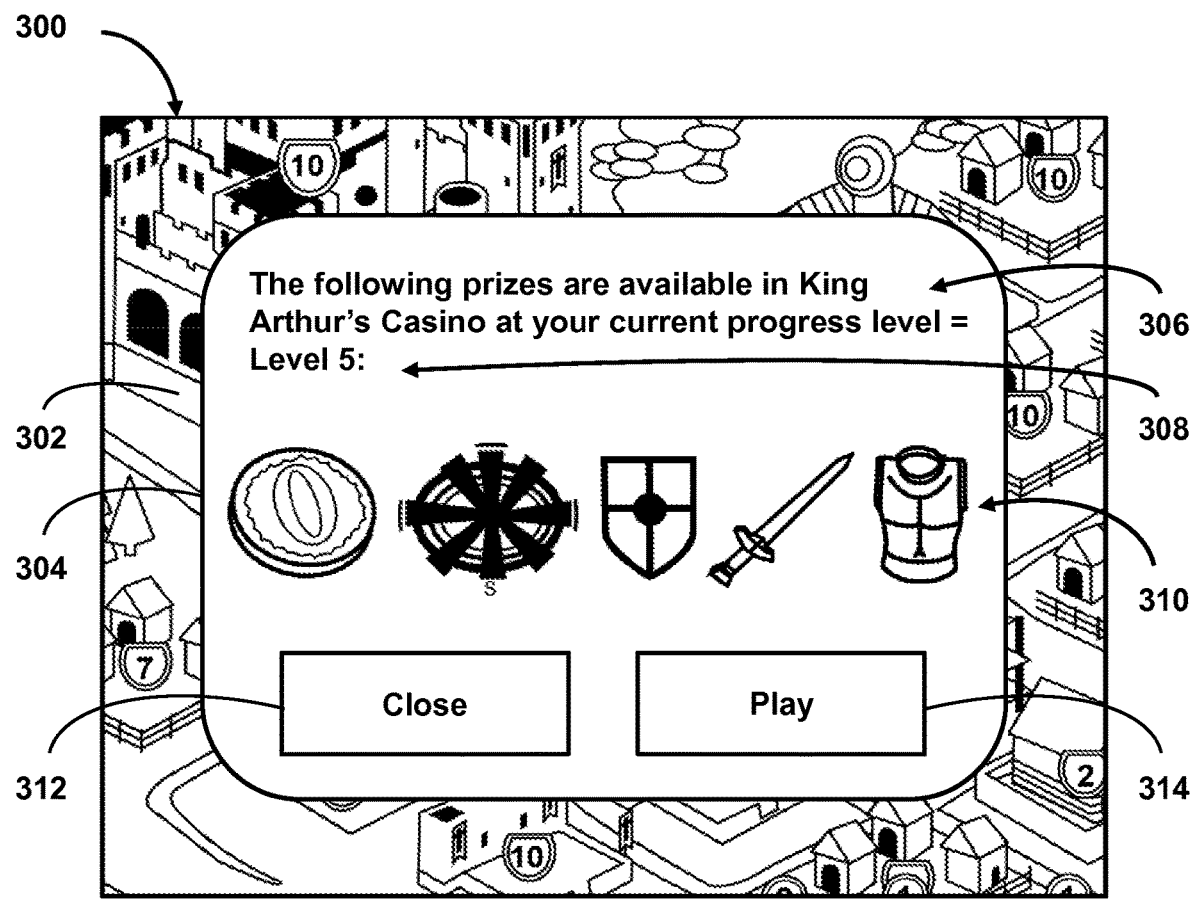
FIG. 3 illustrates an implementation of a notification provided to the users of the online game, in accordance with one or more implementations.

FIG. 3 illustrates an interface 300. The interface 300 may be configured to facilitate participation in an online game 302. The interface 300 may be configured to facilitate participation in a secondary game (see FIGS. 2A and 2B). The interface 300 may be configured to facilitate providing notifications 304 to the users of the online game, in accordance with one or more implementations. The notification component 114 may be configured to provide notifications 304 to users of the online game of an indication of the subsets of potential awards 310 that correspond to the game play metrics of the users that are available in the secondary game. A first user may be provided a notification 304 providing an indication to the first user of the first subset of potential awards 310 that correspond to the gameplay metric of the first user. Such notifications 304 may be provided in order to incentivize players and/or users of the online game to play the secondary game.

The notification(s) 304 may include a notification text 306 informing the users of the online game of the sets of potential awards 310 associated with the user's gameplay metric and/or gameplay metric value 308. The notification (s) 304 may include a visual representation of the sets of potential awards 310 available to the user in the secondary game. The notification(s) 304 may provide one or more interactive buttons to facilitate the user's or users' interaction with the interface 300. For example, the notification(s) 304 may include a close button 312, configured, upon an interaction with the button by the user through a client computing device 104, to close the notification(s) 304. The notification(s) 304 may include a play game button 314 configured, upon an interaction with the button by the user through a client computing device 104, to execute an implementation of a secondary game.

Figure 4:
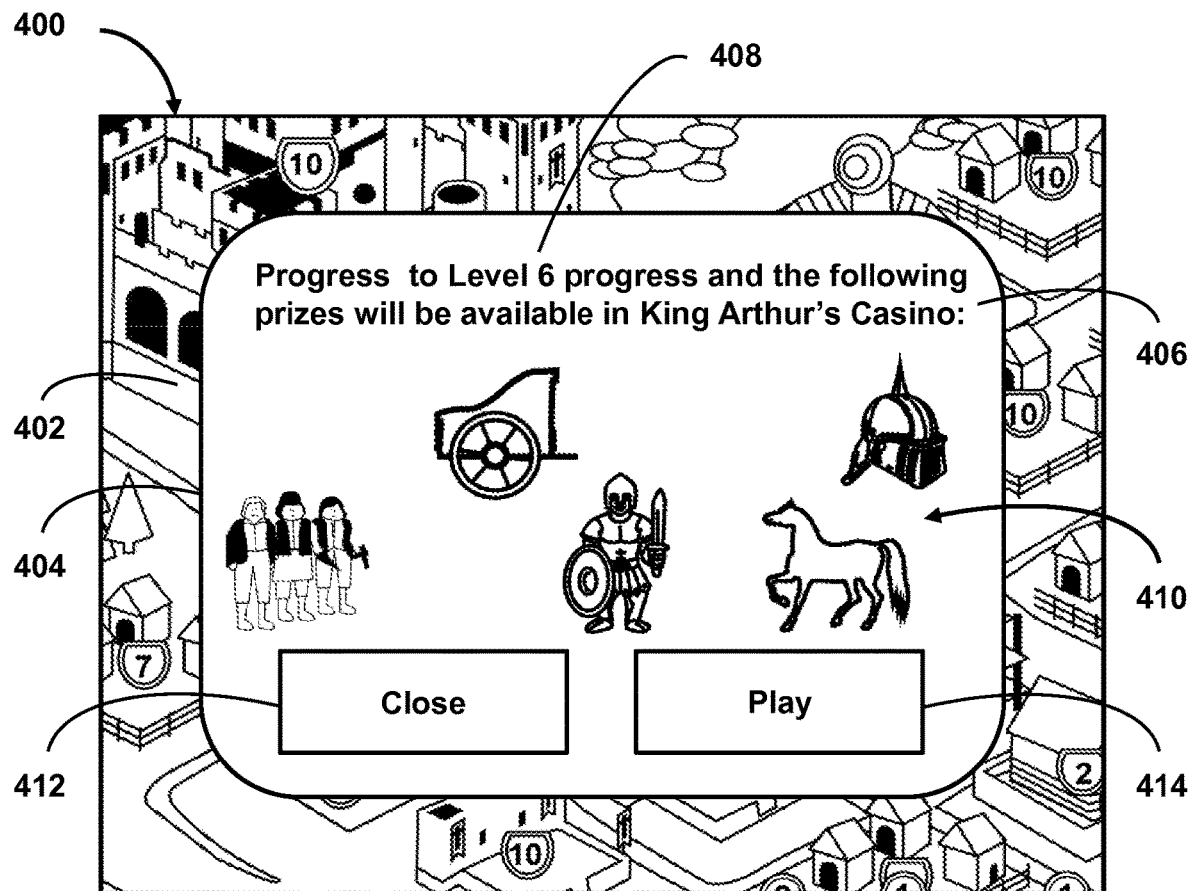
FIG. 4 illustrates an implementation of a notification provided to the users of the online game, in accordance with one or more implementations; and, FIG. 5 illustrates a method for providing awards to users of a virtual space, in accordance with one or more implementations.

FIG. 4 illustrates an interface 400. The interface 400 may be configured to facilitate participation in an online game 402. The interface 400 may be configured to facilitate participation in a secondary game (see FIGS. 2A and 2B). The interface 400 may be configured to facilitate providing notifications 404 to the users of the online game, in accordance with one or more implementations. The notification component 114 may be configured to provide notifications 404 to users of the online game of an indication of the subsets of potential awards 410 that correspond to a higher gameplay metric 408 than the current gameplay metric of the users. For example, for a first user, a notification 404 may be provided to the first user of a second subset of potential awards 410 that correspond to a higher gameplay metric 408 than the gameplay metric of the first user.

The notification(s) 404 may include a notification text 406 informing the users of the online game of the sets of potential awards 310 associated with a user gameplay metric 408 higher than the current user gameplay metric of the user. The notification(s) 404 may include a visual representation of the sets of potential awards 410 available to the user in the secondary game, if the user advances to the higher gameplay metric 408. The notification(s) 404 may provide one or more interactive buttons to facilitate the user's or users' interaction with the interface 400. For example, the notification(s) 404 may include a close button 412, configured, upon an interaction with the button by the user through a client computing device 104, to close the notification(s) 404. The notification(s) 404 may include a play game button 414 configured, upon an interaction with the button by the user through a client computing device 104, to execute an implementation of a secondary game.

Such notifications 404 may be provided to incentivize the players to advance in the online game and/or take further actions in the online game. The online game may have one or more monetization mechanics. By incentivizing players to advance in the online game, take additional actions in the online game, and/or increase gameplay metrics, the online game provider may increase monetization of the users.

Figure 5:
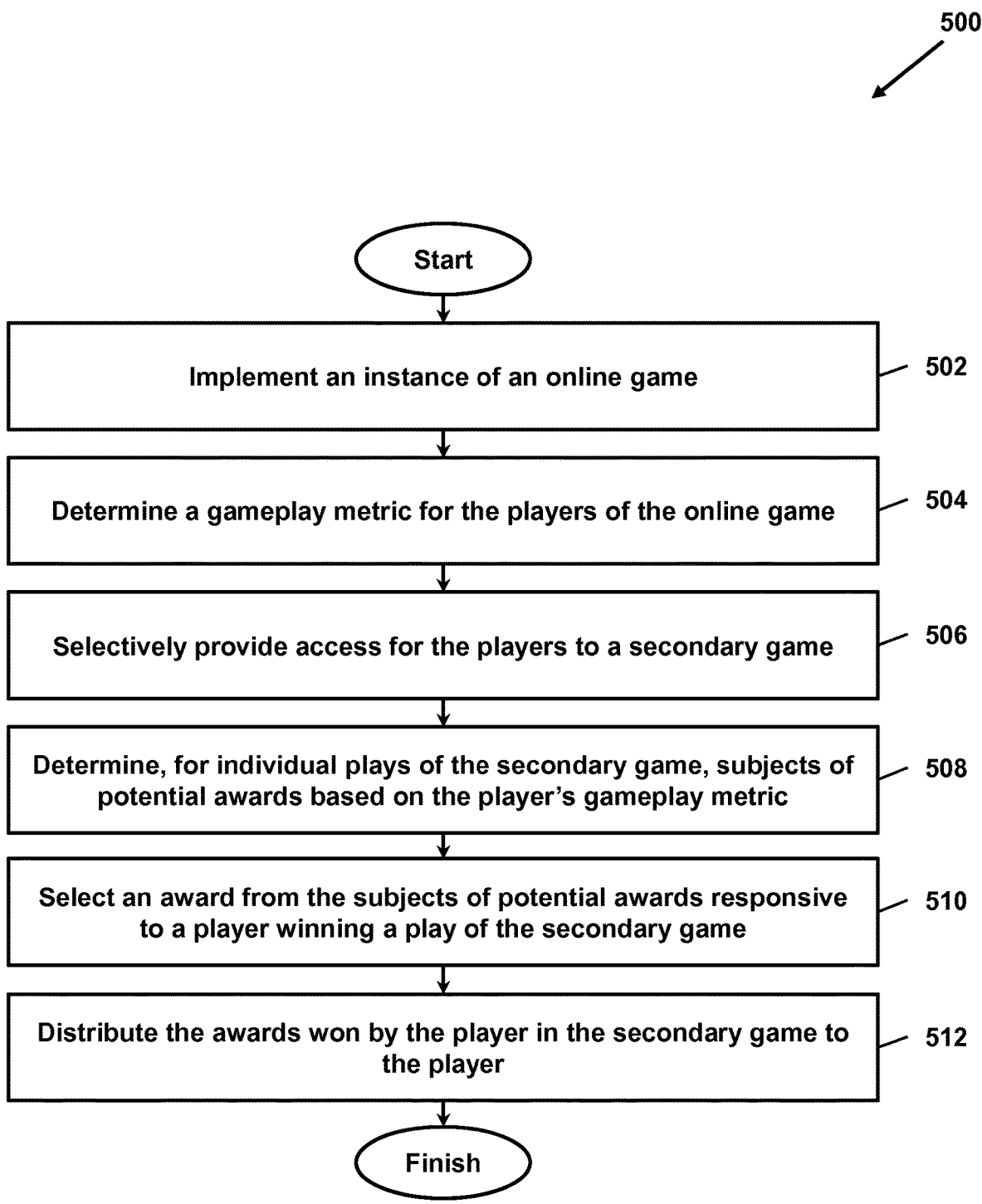

FIG. 5 illustrates a method 500 for providing awards to users of a virtual space.

The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of an online game may be implemented to facilitate player participation in the online game, such that a first player participates in the online game through views of the online game presented through a game interface on a client computing device. Operation 502 may be performed by a space component, such as space component 106, in accordance with one or more implementations.

At an operation 504, a gameplay metric may be determined for the players of the online game, wherein the gameplay metric may be based on actions taken by players in the online game, such that a first gameplay metric for the first player is based on the actions taken by the first player in the online game. Operation 504 may be performed by a space component, such as space component 106, in accordance with one or more implementations.

At an operation 506, access may be selectively provided for the players to a secondary game, wherein the players are presented with the secondary game through the game interface while participating in the online game, and wherein the secondary game includes a set of potential awards. Operation 506 may be performed by a secondary game component, such as secondary game component 112, in accordance with one or more implementations.

At an operation 508, for individual plays of the secondary game, subsets of potential awards may be determined based on the gameplay metrics for the players playing the secondary game, such that, for a first play of the secondary game by the first user, a first subset of potential awards is determined based on the gameplay metric for the first player. Operation 508 may be performed by a secondary game component, such as secondary game component 112, in accordance with one or more implementations.

At an operation 510, for individual plays of the secondary game, an outcome of the secondary game may be determined, wherein the outcome may include an award from the subset of potential awards as the actual award, such that, for a first play of the secondary game by the first user, a first actual award is determined from the first subset of potential awards. Operation 510 may be performed by a secondary game component, such as secondary game component 112, in accordance with one or more implementations.

At an operation 512, distribution of the award(s) obtained during the plays of the secondary game may be facilitated to the users, such that the first actual award is distributed to the first user. Operation 510 may be performed by a distribution component, such as distribution component 116, in accordance with one or more implementations.

The method 500 may further comprise such operations as providing notifications to users of the online game of an indication of the subsets of potential awards that correspond to the gameplay metrics of the users, such that, for a first user, a notification is provided to the first user of the first subset of potential awards that correspond to the gameplay metric of the first user. The method may comprise such operations as providing notifications to users of the online game of an indication of the subsets of potential awards that correspond to a higher game play metric than the current gameplay metric of the users, such that, for a first user, a notification is provided to the first user of a second subset of potential awards that correspond to a higher gameplay metric than the gameplay metric of the first user.

The method 500 may comprise obtaining a set of probabilities for the awards in the subsets of potential awards and stochastically or quasi-stochastically selecting an award from the subsets of potential awards as the actual award for distribution to the users.

The method 500 may further comprise providing players additional plays of the secondary game and determine, for individual plays of the secondary game, an outcome of the secondary game, wherein the outcome includes an award from the subset of potential awards as the actual award, such that for a second play of the secondary game by the first user, a second actual award is determined from the first subset of potential awards.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for incentivizing players of an online game that takes place in a virtual space by providing the players with information regarding potential awards that are available in a secondary game for the players that reach particular levels of progress in the online game, the system comprising:
   one or more physical computer processors configured by machine-readable instructions to:
      execute an instance of the online game and use the instance of the online game to generate game state information that is transmitted to client computing devices over a network, the game state information facilitating presentation of views of the online game to the players via the client computing devices, wherein the client computing devices include a first client computing device associated with a first player, wherein execution of the instance of the online game includes performing operations in the instance of the online game in response to commands received over the network from the client computing devices, wherein execution of the instance of the online game further includes facilitating player participation in the online game, such that the first player participates in the online game through a game interface on the first client computing device, wherein the game interface is configured to present views of the online game to the first player and to receive commands from the first player;
      determine a gameplay metric for individual ones of the players of the online game, wherein the gameplay metric is based on one or more of individual progress of the players in the online game and/or individual actions taken by the players in the online game, such that a first gameplay metric for the first player is based on one or more of actions taken by the first player in the online game and/or a first level of progress by the first player in the online game;
      selectively provide access for the players to a secondary game, wherein the players are presented with the secondary game through the game interface while participating in the online game, and wherein participation in the secondary game potentially results in awarding the players with a set of potential awards, wherein the set of potential awards includes one or more virtual items usable in the online game;
      determine a subset of potential awards that corresponds to a higher gameplay metric than the first gameplay metric, wherein the higher gameplay metric corresponds to a target level of progress in the online game that is higher than the first level of progress; and
      provide information to the first player regarding the subset of potential awards that corresponds to the higher gameplay metric, wherein the subset of potential awards would be available to the first player through the secondary game upon the first player reaching the target level of progress in the online game, thereby incentivizing the first player to make progress in the online game.

2. The system of claim 1, wherein the one or more processors are configured by machine-readable instructions to:
   determine, for individual plays of the secondary game, an outcome of the secondary game, wherein the outcome includes an award from the subset of potential awards as an actual award, such that for a first play of the secondary game by the first player, a first actual award is determined from the first subset of potential awards.

3. The system of claim 2, wherein the one or more processors are configured by machine-readable instructions to:
   facilitate distribution of the first actual award to the first player.

4. The system of claim 2, wherein the secondary game further comprises:

obtaining a set of probabilities for the awards in the subset of potential awards; and stochastically or quasi-stochastically selecting an award from the subset of potential awards as the actual award for distribution to the players.

5. The system of claim 1, wherein the one or more physical computer processors are further configured by machine-readable instructions to:

provide information to the players of the online game regarding the subset of potential awards that corresponds to the higher gameplay metric.

6. The system of claim 1, wherein the subsets of potential awards comprise virtual items, wherein the virtual items have a perceived value in the online game, and where the virtual items in the subset of potential awards corresponding to higher gameplay metric values have a higher perceived value in the online game than the virtual items in other subsets of potential awards corresponding to lower gameplay metric values.

7. The system of claim 1, wherein the secondary game further comprises:

effectuating presentation of an interface to facilitate participation by the players in the secondary game.

8. The system of claim 1, wherein participating in the instance of the secondary game is associated with a cost to the user.

9. A method for incentivizing players of an online game that takes place in a virtual space by providing the players with information regarding potential awards that are available in a secondary game for the players that reach particular levels of progress in the online game, the method to be performed on a computer having one or more physical processors, the method comprising:

executing an instance of the online game and using the instance of the online game to generate game state information that is transmitted to client computing devices over a network, the game state information facilitating presentation of views of the online game to the players via the client computing devices, wherein the client computing devices include a first client computing device associated with a first player, wherein execution of the instance of the online game includes performing operations in the instance of the online game in response to commands received over the network from the client computing devices, wherein execution of the instance of the online game further includes facilitating player participation in the online game, such that the first player participates in the online game through a game interface on the first client computing device, wherein the game interface presents views of the online game to the first player and receives commands from the first player;

determining a gameplay metric for individual ones of the players of the online game, wherein the gameplay metric is based on one or more of individual progress of the players in the online game and/or individual actions taken by the players in the online game, such that a first gameplay metric for the first player is based on one or more of the actions taken by the first player in the online game and/or a first level of progress by the first player in the online game;

selectively providing access for the players to a secondary game, wherein the players are presented with the secondary game through the game interface while participating in the online game, and wherein participation in the secondary game potentially results in awarding the players with a set of potential awards, wherein the set of potential awards includes one or more virtual items usable in the online game;

determining a subset of potential awards that corresponds to a higher gameplay metric than the first gameplay metric, wherein the higher gameplay metric corresponds to a target level of progress in the online game that is higher than the first level of progress; and providing information to the first player regarding the subset of potential awards that corresponds to the higher gameplay metric, wherein the subset of potential awards would be available to the first player through the secondary game upon the first player reaching the target level of progress in the online game, thereby incentivizing the first player to make progress in the online game.

10. The method of claim 9, further comprising:

determining, for individual plays of the secondary game, an outcome of the secondary game, wherein the outcome includes an award from the subset of potential awards as an actual award, such that, for a first play of the secondary game by the first player, a first actual award is determined from the first subset of potential awards.

11. The method of claim 10, further comprising:

facilitating distribution of the first actual award to the first player.

12. The method of claim 10, wherein the secondary game further comprises: obtaining a set of probabilities for the awards in the subset of potential awards; and stochastically or quasi-stochastically selecting an award from the subset of potential awards as the actual award for distribution to the players.

13. The method of claim 9, further comprising:

providing information to the players of the online game regarding the subset of potential awards that corresponds to the higher gameplay metric.

14. The method of claim 9, wherein the subsets of potential awards comprise virtual items, wherein the virtual items have a perceived value in the online game, and where the virtual items in the subset of potential awards corresponding to higher gameplay metric values have a higher perceived value in the online game than the virtual items in other subsets of potential awards corresponding to lower gameplay metric values.

15. The method of claim 9, wherein the secondary game further comprises:

effectuating presentation of an interface to facilitate participation by the players in the secondary game.

16. The method of claim 9, wherein participating in the instance of the secondary game is associated with a cost to the user.

* * * * *